Figure 1:
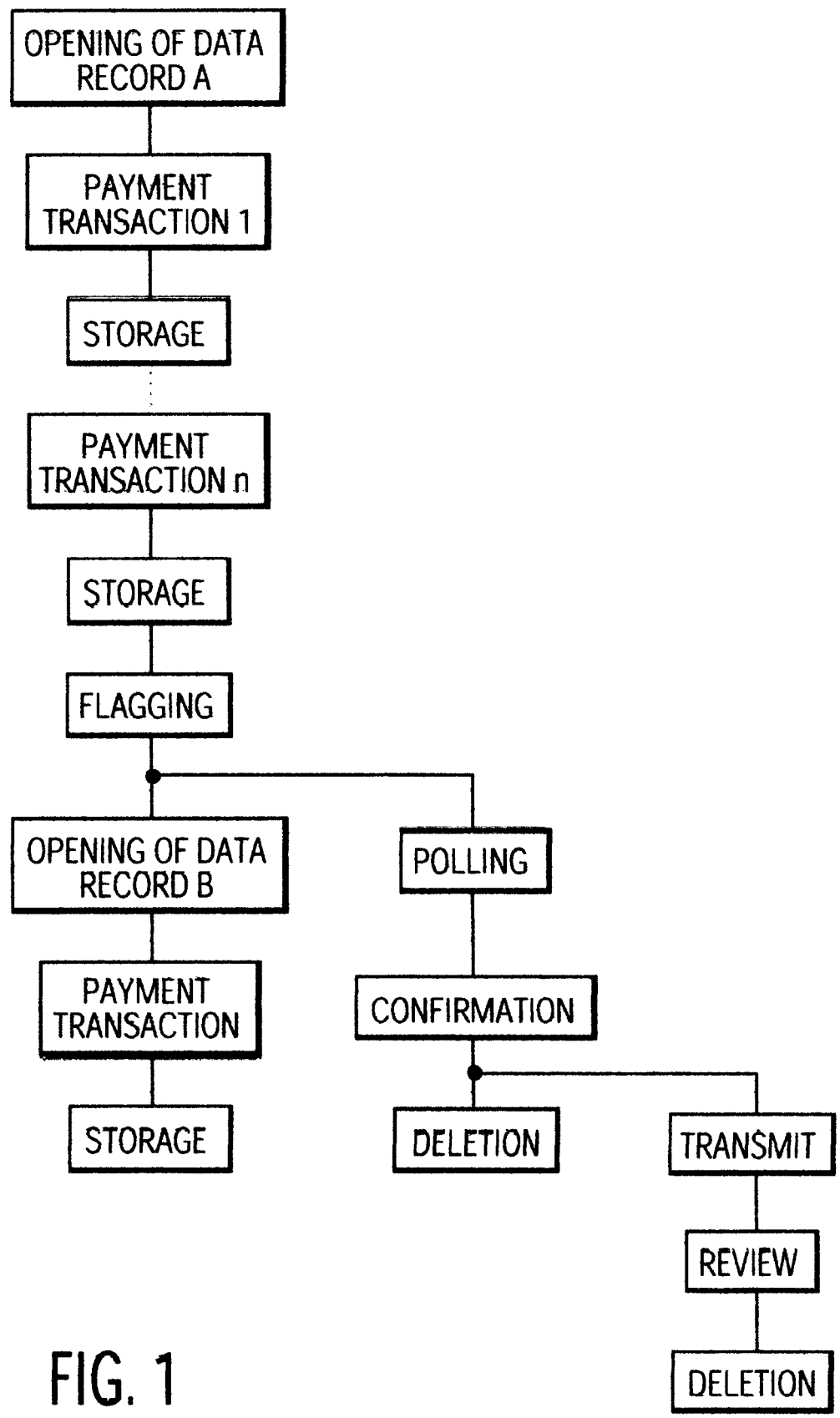

United States Patent [19]

Bublitz et al.

[11] Patent Number: 6,029,152

[45] Date of Patent: Feb. 22, 2000

[54] PROCESSING OF TRANSACTION DATA

[75] Inventors: Hermann Bublitz, Alicante, Spain; Adam R. Newth, London, United Kingdom

[73] Assignee: International Business Machines Corporation, Armonk, N.Y.

[21] Appl. No.: 09/106,428

[22] Filed: Jun. 29, 1998

[30] Foreign Application Priority Data

Jun. 27, 1997 [DE] Germany .......................... 197 27 386

[51] Int. Cl.⁷ .................................................. G06F 17/30
[52] U.S. Cl. .............................................. 705/40; 705/17
[58] Field of Search ................................ 705/40, 17, 26, 705/39, 44

[56] References Cited

U.S. PATENT DOCUMENTS

| 5,812,668 | 9/1998 | Weber | 380/24 |
|---|---|---|---|
| 5,889,863 | 3/1999 | Weber | 380/25 |
| 5,920,847 | 7/1999 | Kolling et al. | 705/40 |
| 5,943,424 | 8/1999 | Berger et al. | 380/25 |

*Primary Examiner*—Emanuel Todd Voeltz
*Assistant Examiner*—Phillip Groutt
*Attorney, Agent, or Firm*—Ronald L. Drumheller

[57] ABSTRACT

The invention relates to a procedure for processing data, especially transaction data, in an electronic payment system, whereby the electronic payment system includes a minimum of one payment terminal, a collections device and a transaction system. During the procedure, a data record is generated with header data (1), a payment transaction is executed by the minimum of one payment terminal (2), information concerning the payment transaction is stored in the data record (3), the data record is flagged as a shadow data record (6), and an additional data record with additional header data is generated (7), whereby the additional data record is generated before a further payment transaction (8) begins.

11 Claims, 1 Drawing Sheet

PROCESSING OF TRANSACTION DATA

The invention relates to a procedure for processing data, especially transaction data, in an electronic payment system, whereby the electronic payment system includes a minimum of one payment terminal, a collection entity and a payment entity.

The electronic exchange is known as a method of cash-free payment for goods and services. In this method, a financial institution issues a chip card to a customer and registers the data for the customer and the issued chip card. Included among the registered data are especially the type and manner of utilization of the chip card, the credit limit, the period of validity and the booking procedure.

The chip card is initialized before issuance to the customer, that is, application data which allow the use of the chip card within the environment of specific applications are stored on the chip card. When the chip card is issued, the customer is informed concerning the applications for which the chip card may be utilized.

In order to be able to use the chip card to pay for goods and services with an electronic exchange, an amount of money must first be stored on the chip card. The customer transfers a specific cash amount at a counter of the financial institution for this purpose, or has the specific amount deducted from his account. A credit balance is then stored on the chip card in the amount of the specific sum. The customer may then use the chip card to make payments up to this amount. The financial institution transfers the same specific amount to an exchange account. A retail business later receives its money from this exchange account when the customer has made a payment with the chip card to the retail business.

Once the credit amount has been used, the chip card must be "loaded" again. Loading of a credit balance onto the chip card may be performed with a suitable loading terminal by a counter clerk of the financial institution. In addition, any number of automated bank machines which are equipped for this function may be used.

If the customer wishes to pay for an article in the shop of a retail business at a later time with the use of the chip card, this transaction may be performed at a POS terminal (point-of-sale terminal).

The chip card is inserted into a chip-card scanner which has been installed in the POS terminal. The data from the chip card may be read from the chip card or data may be written onto the chip card using the chip card scanner. Especially, the credit amount which has been stored on the chip card may be lowered by the amount which is to be paid for goods at the retail business. The residual credit amount is left on the chip card.

Within the context of the transaction at the retail business, the transaction data are stored in the POS terminal which contain the information as to the amount to be paid, the financial institution which maintains the exchange account, and additional data concerning the customer and the retail business. These transaction data are stored in the POS terminal in data records.

At least one data record is generated for every combination of exchange account owner, exchange account and currency, at the latest when the corresponding transactions are performed. The sum of the amounts is contained per data record, that is, the amount which the owner of the exchange account owes the retail business, as well as ID codes for the retail business, for the owner of the exchange account, for the currency and for the data record itself. As an option, data of every individual transaction may also be stored.

After the expiration of one day or another period of time, one or more data records are polled by a collection entity. The collection entity may be linked with multiple POS terminals. The receipt of the data records is confirmed by the collection entity to the POS terminals.

After the receipt of the data records, the collection entity transmits the data records on to the payment entity. The payment entity analyzes whether the transactions registered in the data records are correct, especially whether the ID code of the retail business is correct. If this is the case, the amounts payable to the retail businesses are transferred to them, and the exchange account of the electronic exchange is reduced by the corresponding amount.

A disadvantage of the procedure as described is that, from the beginning of the polling of a data record by the collection entity up to the receipt of the confirmation that the data record has arrived at the collection entity or the payment entity completely, correctly and intact, a POS terminal may not be utilized because, during this time period, no additional transaction data can be stored in the data record which is used for the storage of transaction data.

The object of the present invention is therefore to create a procedure of the type described initially which makes it possible to minimize the time in which terminals in an electronic payment system may not be utilized.

This object is achieved in accordance with the invention by a procedure consisting of the following process steps:

generation of a data record which includes header data, performance of the payment transaction by means of the minimum of one terminal, storage of information concerning the payment transaction in the data record, flagging the data record as a shadow record, and generation of an additional data record which includes additional header data, whereby the additional data record is generated before a further payment transaction begins.

The essential benefit which is achieved with the invention as compared to the current state of the art of technology exists in that the payment terminal is also available for use by the retail business during the time in which the data of previously-concluded transactions continue to be processed. As a result of this, interruptions in the utility of the payment terminal by the retail business and the customer are avoided.

In addition, the data of the shadow data record may be processed at any point in time by the use of the procedure in accordance with the invention. In this manner, optimal utilization of the transmission capacities is possible when the data must be transmitted by means of lines for further processing.

In an appropriate embodiment of the invention, the procedure also includes the additional process steps of:

polling the total information of the shadow data record by the collection entity, whereby the total information includes the header data and the stored information concerning the payment transaction, transmission of the total information of the shadow data record to the payment entity, review of the total information by the payment entity, sending a confirmation of the receipt of the total payment information by the payment entity to the payment terminal, and deletion of the shadow data record.

In this manner, the shadow data record is stored until the total information of the shadow data record has been received by the payment entity and the data of the shadow data record have been reviewed by the payment entity. If an error occurs during the transmission and/or the processing of the shadow data record which results in a partial loss of data, then the shadow data record continues to be available for review of the transaction.

An appropriate embodiment of the invention provides that the deletion of the shadow data record is executed after the confirmation has been received by the payment terminal that the collection entity has received the total information. As a result, the shadow data record is deleted at the earliest possible point in time after its generation in order to make effective use of the limited storage capacity of the payment terminal.

It may be provided as a benefit that the deletion of the shadow data record is executed after the receipt of confirmation by the payment terminal that the payment entity has determined in the review that the total information in the shadow data record is correct. This is especially beneficial when it is determined that problems have occurred during the transmission of the total information to the collection entity or during the transmission to the payment entity which lead to a data loss. In this event, the shadow data record is available for a repetition of the transmission procedures.

It may be provided as a benefit of the procedure in accordance with the invention that an additional payment transaction is executed by means of the minimum of one payment terminal, that information concerning the additional payment transaction is stored in the additional data record, and that the additional data record is flagged as an additional shadow data record. As a result, the data of successively-occurring transactions may be beneficially stored in chronological sequence. Depending on the storage capacity of the payment terminal, a number of shadow data records may be generated. This number of shadow data records may be polled at any point in time by the collection entity.

A beneficial embodiment of the procedure in accordance with the invention provides that the flagging of the data record as a shadow data record and/or the flagging of the additional data record as an additional shadow data record is executed by means of the header data or the additional header data. This represents an option for flagging the data record as a shadow data record which is especially easy to execute and may be analyzed with little expenditure.

A beneficial further embodiment of the invention provides that information concerning each of at least two payment transactions is stored in the one data record and/or in the additional data record, as a result of which storage space is saved in the payment terminal and the information concerning multiple payment transactions can be transmitted by means of one data record.

It is appropriate to poll the total information of several shadow data records by the collection entity simultaneously and to review the respective total information by the payment entity. Line capacities are saved by the simultaneous transfer of several shadow data records since it is not necessary to establish an on-line connection for the transmission of every individual shadow data record between the collection entity and the payment terminal.

A beneficial further embodiment of the invention provides that a chip card with a stored amount of money is used during the payment transaction and/or during the additional payment transaction by means of the minimum of one payment terminal. The procedure in accordance with the invention may be applied here especially beneficially since the essential purpose of a chip card with a stored amount of money is to be able to perform a number of transactions with lower sums in each case. As a result of this, a number of data records are created. In the processing of this number of data records, essential time savings are realized as a result of the procedure in accordance with the invention.

In a beneficial further development of the invention it may be provided that the collection entity and the payment entity are configured as segments of a network and that the polling of the total information of the shadow data record by the collection entity and the transmission of the total information of the shadow data record to the payment entity is performed by means of this network. An embodiment of these process steps by means of a network provides the benefit that the shadow data records may be transferred to any segments of the network desired.

A beneficial further embodiment of the invention may be formed in that, during the review of the total information of the shadow data record by the payment entity, security-relevant functions may be used, whereby the security-relevant functions may be made available by a security module of the payment entity. This is beneficial because the shadow data records also contain information which must be kept in confidence from persons who are not involved in the transaction. Security-relevant functions may be used beneficially for this.

The invention will be described in more detail below with the help of a diagram. For this purpose, FIG. 1 depicts a schematic representation of the process sequence of the procedure in accordance with the invention.

In accordance with FIG. 1, a data record A is generated 1 in a payment terminal, before a payment transaction is begun. The data record A includes header data. The header data include especially information about the retail business at which the payment terminal has been installed, about the owner of the electronic exchange, about the currency and about the cryptographic security features which are utilized upon storage of the data record in order to decode the data.

The exact configuration of the payment terminal may vary. For example, point-of-sales terminals are known to specialists in this field. Using these terminals, a customer is able to make payments at a retail business without cash. As a procedure for cash-free payments for goods and services, payments with the EC card, a credit card or a chip card may especially be utilized. The payment terminal includes an appropriate read-write device for communication with the individual card.

Information is stored 2, 3, 4, 5, in the data record A concerning the payment transactions 1 to n, whereby the storage 3, 5, is always performed before a new payment transaction 4 begins. If the payment transaction 2, 4, was performed within the environment of an electronic exchange, then the stored information includes data especially concerning the customer, the retail business and the amount to be paid. The stored information provides a register of every payment transaction. For this purpose, the number of payment transactions which are registered in data record A is stored in the header data.

After any number of payment transactions have been performed and the corresponding information concerning these payment transaction has been stored 2, 3, 4, 5, in data record A, the data record A is closed. The status of data record A is changed in that the data record A is flagged as a shadow data record 6. Flagging of the shadow data record 6 may be executed using status bits in the header data, for instance. However, storage of the shadow data record A is also possible in a special memory location which is provided for shadow data records.

After the data record A is flagged 6 as a shadow data record A, an additional data record B is opened 7. This data record B also includes header data with the described information concerning the retail business and the owner of the electronic exchange. The generation of data record B is executed before the next payment transaction 8 is begun subsequent to closing of the data record A. As a result of this, it is ensured that no information concerning a payment transaction 8 is lost. Information concerning additional payment transactions which follow chronologically may then be stored 8, 9, in data record B.

At a random point in time after the conclusion of the flagging of the data record A as a shadow data record A6, the shadow data record may be polled 10 by a collection entity.

The collection entity is preferably implemented as a part of a computer center. An on-line link is then established between the payment terminal and the computer center for the polling of the data record A 10. It may also be provided that the collection entity is a segment of a network or is arranged in a client/server environment. This makes the beneficial rapid distribution of information from the data record A possible.

A number of data records which are polled from different payment terminals are concentrated in the collection entity. After the collection entity has received the shadow data record A completely and correctly, it sends confirmation to the payment terminal 11. Once the payment terminal has received this confirmation of receipt, the shadow data record A may be deleted 12. Deletion of the shadow data record A 12 immediately after the receipt of the confirmation that the shadow data record A was correctly received by the collection entity has the benefit that the memory space which was used for the storage of the copy of shadow data record A in the limited memory space of the payment terminal is once again made available.

The shadow data record A is transmitted 13 from the collection entity to a payment entity for a review of the data 14 which are stored in the shadow data record A. The payment entity may also be a part of a computer center or be arranged as part of a network.

The payment entity reviews 14 whether the payment transaction concerning which information was stored in the shadow data record A has been correctly processed and whether the transmitted data are complete. If both conditions have been fulfilled, the payment entity sends a corresponding signal to the payment terminal by means of the collection entity. The retail business simultaneously receives a transfer of the funds owed to it, or the transfer is initiated for a later point in time. In this step, this amount of money must be deducted from the exchange account of the owner of the electronic exchange.

Security-relevant functions are utilized during the review of the information of shadow data record A 14. For this, especially the review of the cryptographic securities taken from shadow data record A may be necessary. The cryptographic codes required for this are made available from a security module, whereby the security module is arranged in the payment entity. Corresponding security modules may be executed as chip cards, for example.

It may be provided that the shadow data record A is not deleted 15 until after the payment terminal has received a signal from the payment entity which indicates that, during the review of the information of shadow data record A, it was established that the payment procedures had been sequenced properly. This has the benefit that the shadow data record may be re-accessed if errors occur in the transmission path of the shadow data record A from the payment terminal to the payment entity and the shadow data record A was not completely transmitted as a result to the payment entity. In addition, a review of the shadow data record A utilizing the shadow data record A in the payment terminal may be repeated if it is established that payment transactions did not run correctly or if the shadow data record transmitted to the payment entity was incomplete. In this manner, it may be established whether the payment transactions actually did not run correctly or whether there was a transmission error from the payment terminal to the payment entity.

In each case, single or multiple shadow data records may be polled from the collection entity or transferred from the collection entity to the payment entity. It is possible for the collection entity to concentrate shadow data records from different payment terminals and that these are then transmitted to a specific payment entity based on their association with a specific electronic exchange.

We claim:

1. A procedure for the processing of data, especially of electronic data, in an electronic payment system, whereby the electronic payment system included at least one payment terminal, a collections device and a transactions system, characterized by the following process steps:

a) generation of a data record (1) which includes header data, b) execution of a payment transaction (2) by means of the minimum of one payment terminal, c) storage of information (3) concerning the payment transaction in the data record, d) flagging the data record (6) as a shadow data record, e) generation of an additional data record (7) which includes additional header data, whereby the additional data record is generated before a further payment transaction begins (8).

2. A procedure in accordance with claim 1, characterized by the additional process steps:

polling of the total information of the shadow data record by the collection entity, whereby the total information contains the header data and the stored information concerning the payment transaction, transmission of the total information of the shadow data record (13) to the payment entity, review of the total information by the payment entity, sending a confirmation (11) of the receipt of the total information by the payment entity to the payment terminal, and deletion of the shadow data record (12).

3. A procedure in accordance with claim 2, characterized in that the deletion of the shadow data record (12) is executed after confirmation is received from the payment terminal that the collection entity has received the total information.

4. A procedure in accordance with claim 2, characterized in that the deletion of the shadow data record (15) is executed after confirmation is received from the payment terminal that, during the review, the payment entity has established that the total information from the shadow data record is correct.

5. A procedure in accordance with claim 2, characterized in that security-relevant functions are utilized by the payment entity during the review of the total information of the shadow data record, whereby the security-relevant functions are made available by a security module of the payment entity.

6. A procedure in accordance with claim 1, characterized by the additional process steps:
   execution of an additional payment transaction (8) by means of the minimum of one payment terminal,
   storage of information (9) concerning the additional payment transaction Ln the additional data record, and
   flagging the additional data record as an additional shadow data record.

7. A procedure in accordance with claim 6, characterized in that the total information of several shadow data records is polled by the collection entity simultaneously and the specific total information is reviewed by the payment entity.

8. A procedure in accordance with claim 6, characterized in that the collection entity and the payment entity are arranged as parts of a network and that the polling of the total information of the shadow data record by the collection entity and the transfer of the total information of the shadow data record to the payment entity is executed by means of the network.

9. A procedure in accordance with claim 1, whereby the flagging of the data record as a shadow data record and/or the flagging of the additional data record as an additional shadow data record is executed by means of the header data or the additional header data.

10. A procedure in accordance with claim 1, characterized in that information concerning a minimum of two payment transactions is stored in each case in the data record and/or in the additional data record.

11. A procedure in accordance with claim 1, characterized in that a chip card with a stored amount of money is utilized during the payment transaction and/or the additional payment transaction by means of the minimum of one payment terminal.

* * * * *

Disclaimer

6,029,152—Hermann Bublitz, Alicante, Spain; Adam R. Newth, London, United Kingdom. PROCESSING OF TRANSACTION DATA Patent dated Feb. 22, 2000. Disclaimer filed Oct. 4, 2006, by the assignee, International Business Machines Corporation.

Hereby enters this disclaimer to all claims, of said patent.

*(Official Gazette, January 9, 2007)*